UNITED STATES PATENT OFFICE.

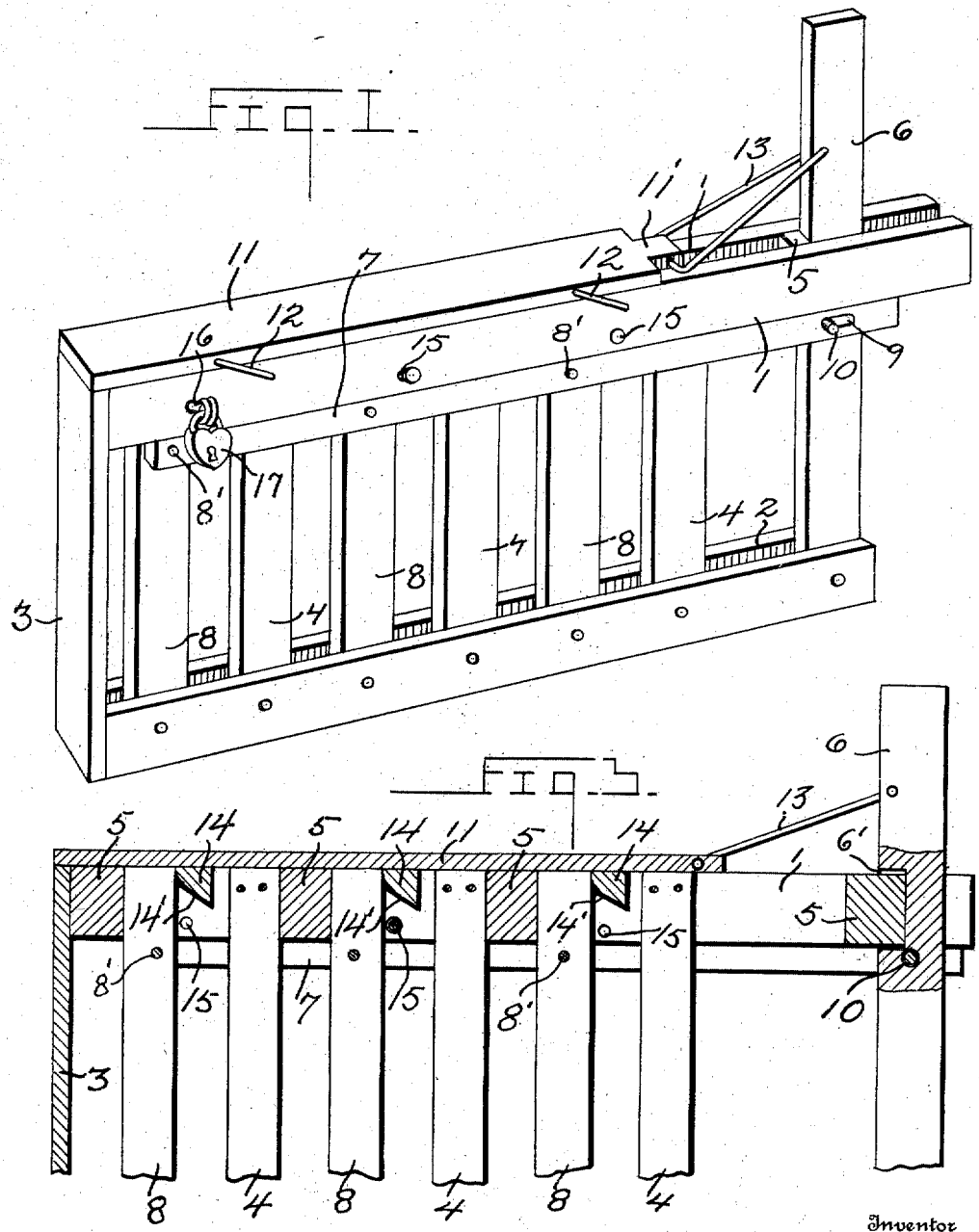

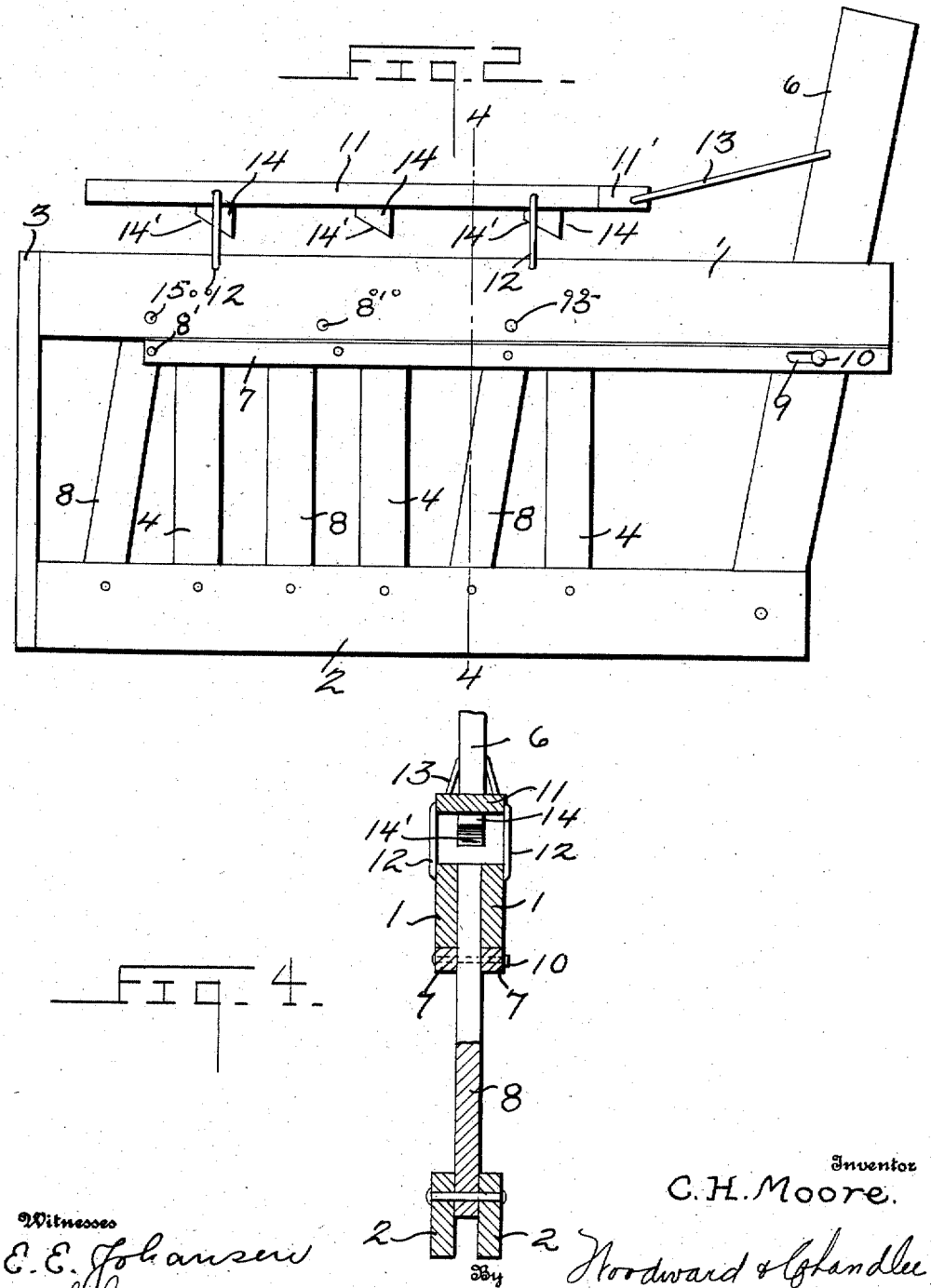

CLARANCE H. MOORE, OF FAIRMONT, MINNESOTA.

STANCHION.

980,163.  Specification of Letters Patent.  Patented Dec. 27, 1910.

Application filed June 26, 1909. Serial No. 504,580.

*To all whom it may concern:*

Be it known that I, CLARANCE H. MOORE, a citizen of the United States, residing at Fairmont, in the county of Martin and State of Minnesota, have invented certain new and useful Improvements in Stanchions, of which the following is a specification.

This invention relates to new and useful improvements in stanchions, and has for its object to provide a simply-constructed device of this character by means of which it is possible to operate any one or more of a plurality of stanchion bars independently of the rest of said bars when it is desired to release any one of the animals confined therein.

A further object is to provide new and novel means for locking the stanchion bars to prevent any liability of the same being operated by the efforts of the animals to release themselves.

A further object is to provide means by which the stanchion bars may be securely held in position after the same have been locked upon the animals, whereby any unauthorized operation of the same may be prevented.

With these and other objects in view, the present invention consists in the combination and arrangement of parts as will be hereinafter more fully described and particularly pointed out in the appended claims, it being understood that changes in the specific structure shown and described may be made within the scope of the claims without departing from the spirit of the invention.

In the drawings forming a part of this specification, and in which like numerals of reference indicate similar parts in the several views, Figure 1 is a perspective view of my improved stanchion, the stanchion bars being locked in closed position to prevent the operation of the same. Fig. 2 is a side elevation of the same showing one of the bars closed, the remainder being shown in open position. Fig. 3 is a longitudinal fragmentary section of the stanchion illustrating the means employed to retain the bars in their closed position. Fig. 4 is a vertical transverse section on the line 4—4 of Fig. 2.

Referring to the drawings, 1 indicates the upper longitudinal parallel bars, and 2 the lower parallel bars. These bars have one of their ends connected by the vertical bar 3, and a plurality of uprights 4 have their ends secured between the same. The upper parallel bars 1 project some distance beyond the ends of the lower bars 2, and have suitable spacing blocks 5 secured between the same. An operating lever 6 is pivoted between the free ends of the lower bars 2 and extends between the upper spaced bars 1, and has secured to either side thereof the horizontal bars 7, which extend in longitudinal parallel relation beneath the upper bars 1. To these bars 7 and between the uprights 4, a plurality of stanchion bars 8 are pivotally secured, and have their lower ends pivoted between the lower parallel bars 2. The outer ends of the parallel bars 7 have the short longitudinal slots 9 formed therein through which extends the transverse pin 10 secured in the operating lever 6.

A locking plate 11 is disposed above the bars 1 and is pivotally connected thereto by means of the pivot links 12 which extend through either end thereof and through the bars 1. One end of the plate 11 is reduced in width as shown at 11', and has extending therethrough one end of the link rod 13, the other end of which is secured to the lever 6, to which it is thus operatively connected. Upon the under side of the plate 11 a plurality of locking blocks 14 are secured, one end of each being provided with a beveled surface 14', which extends from the bottom thereof to a point slightly below the under surface of the plate 11. Thus it will be seen that a short vertical surface is provided upon one end of the blocks, the remainder of said ends receding in the direction of the lever 6. The edge of the lever 6 is provided with a recess 6' which is adapted to engage with the spacing block 5, arranged between the bars 1, when the plate is in locking position, thus preventing any vertical movement of the operating lever.

The pivot pins 8' by means of which the stanchion bars 8 are secured between the longitudinal bars 7, are removable therefrom and may be inserted through the opening 15 which extends through the upper parallel bars 1, thus preventing any pivotal movement of the stanchion bar 8 from which the pin has been removed, upon the operation of the lever 6 to open the remainder of the stanchion bars. A bolt 16 is also provided and is adapted to be inserted through the bars 1 in front of the end stanchion bar 8. This bolt is provided with an eye at one of its ends through which the hasp of a suitable padlock 17 is adapted to be inserted and locked thereon. By this means any operation of the lever is prevented by unauthorized persons, thus insuring the security of the animals confined therein.

In operation, presuming that the locking plate is in the position shown in Fig. 3, it will be obvious that any movement of the bars 8 due to the efforts of the animals to release themselves, will be prevented, as the upper ends of said bars contact with the vertical surfaces of the ends of the locking blocks 14. When it is desired to release the animals in case of emergency or to turn the same out to pasture, the lever 6 is drawn backward, which will impart a vertical and longitudinal movement to the locking plate 11 through the medium of the link 13. The bars 7 will then be drawn longitudinally and will move the stanchion bars 8 until the same are angularly disposed between the uprights 4 and the vertical bar 3, whereby sufficient space will be allowed for the animals' heads to pass between the same. It will be noted that these two operations are simultaneously accomplished. When it is again desired to confine the animals in the stanchions the operating lever 6 is moved forwardly. Upon this forward movement the transverse pin 10 will move in the slots 9 in the ends of the parallel bars 7 so that no movement will be imparted to the same and thus the stanchion bars 8 will still retain their open position. The locking plate will, however, have moved forwardly and downwardly to some extent and upon the continued movement of the operating lever 6, both the bars 7 and the locking plate 11 will be moved longitudinally of the bars 1. During the longitudinal movement of the plate 11, the same is continually descending and will finally contact with the upper forward edge of the stanchion bars 8. This edge or corner contacts with the beveled surface of the end of the locking blocks 14, and moves the bars forwardly into position for the same to be engaged by the vertical portions of the ends of the blocks. The bars 7 are, of course, also moved forwardly until the transverse pin 10 contacts with the rear end of the slot 9, thus compensating for the lost motion of said bars during the initial movement of the operating lever 6. The movement of the lever is continued until the locking plate 11 is disposed upon the upper edges of the parallel bars 1, when the various parts will be in the position as shown in Fig. 3, and the animals securely locked in the stanchions. During the absence of the owner the bolt 16 may be placed in position and locked by means of the padlock 17 to prevent the device being tampered with or his cattle stolen.

From the foregoing it will be seen that I have provided a very simple and inexpensively constructed stanchion, which may be very quickly operated and by means of which the efforts of the animals to release themselves will be unavailing. The device may be readily secured in the end of an animal crate or case and owing to its inexpensiveness of construction may be used for transportation purposes.

Any one or the whole number of stanchion bars may be operated at one movement of the operating lever which may easily be actuated by a woman or child without the necessity of coming into contact with the animals. When it is desired to release only a certain number of the animals, the remainder of the stanchion bars may be securely locked against movement as before described.

What is claimed is:

1. In a device of the character described, the combination with a frame including a plurality of stationary bars, of a plurality of stanchion bars pivoted in said frame for movement into and out of coöperative relation to the stationary bars, an operating lever pivotally mounted in one end of said frame, spaced longitudinally extending bars secured to said lever and to said stanchion bars, and a locking plate pivotally secured to said frame and vertically and longitudinally movable above the same, adapted to lock said stanchion bars in their closed position.

2. In a device of the character described, the combination with a stanchion frame including a stationary bar of a stanchion bar pivoted in said frame, an operating lever pivotally mounted in one end of said frame, parallel longitudinal bars secured at one end to said lever, said stanchion bar being extended between said parallel bars and movable therewith, a locking plate pivoted to said frame and vertically and longitudinally movable above the same, a link connecting one end of said plate with said operating lever, and means secured to the under side of said plate and adapted to lock said stanchion bar against pivotal movement.

3. In a device of the character described, the combination with a stanchion frame, comprising upper and lower parallel bars, vertical bars secured to one end of said parallel bars, a plurality of uprights having their ends secured between said parallel bars, a plurality of stanchion bars pivoted at their lower ends between the lower parallel bars, an operating lever pivotally mounted between the lower ends of said bars and extending between said upper bars, longitudinal bars secured at one end to said lever upon either side and extending in parallel relation to said upper bars and beneath the same, said longitudinal bars being pivotally connected to said stanchion bars, a locking plate pivoted to said upper bars and vertically and longitudinally movable above the same, a link connecting said locking plate with said operating lever, blocks secured to the under side of said locking plate, one end of said blocks being formed with a vertical and beveled surface, and adapted to be disposed between said uprights and said stanchion bars to lock the same in their closed positions.

4. The combination with a stanchion frame including stationary bars, of a plurality of stanchion bars pivoted in said frame for movement into and out of coöperative relation to the stationary bars, an operating lever pivotally mounted in one end of said frame, parallel longitudinal bars secured at one of their ends to either side of said lever, said stanchion bars being pivotally secured between said parallel longitudinal bars, a transverse pin secured in said lever and extending into longitudinal slots in the ends of said parallel bars, a locking plate pivoted to said frame and vertically and longitudinally movable above the same, openings in said frame adapted to receive the pivotal connections between said stanchion bars and the longitudinal parallel bars whereby the pivotal movement of any one of said stanchion bars may be prevented upon the operation of said lever, and a bolt adapted to extend through said frame and to be locked therein to prevent the operation of said lever.

5. A cattle stanchion comprising a stationary vertical bar, a stanchion bar movable into and out of coöperative relation to the stationary bar, guides for the movable stanchion bar, a lever arranged for movement between the guides, a horizontal bar connected to the stanchion bar, connections between said horizontal bar and the lever, said connections being arranged to permit of slight lost motion between the bar and lever, means for locking the stanchion bar in operative position, and connections between said locking means and the lever for movement of the locking means into and out of operative position, when the lever is moved.

In testimony whereof I affix my signature, in presence of two witneses.

CLARANCE H. MOORE.

Witnesses:
 E. C. DEAN,
 GRACE C. KELTGEN.